United States Patent
Zhang et al.

(10) Patent No.: US 9,459,655 B2
(45) Date of Patent: Oct. 4, 2016

(54) LAPTOP

(71) Applicants: Beijing Lenovo Software Ltd., Beijing (CN); Lenovo (Beijing) Co., Ltd., Beijing (CN)

(72) Inventors: Chunsun Zhang, Beijing (CN); Zhigang Na, Beijing (CN); Huajun Dong, Beijing (CN); Dehong Meng, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 6 days.

(21) Appl. No.: 14/577,538

(22) Filed: Dec. 19, 2014

(65) Prior Publication Data

US 2015/0370286 A1 Dec. 24, 2015

(30) Foreign Application Priority Data

Jun. 24, 2014 (CN) .......................... 2014 1 0288793
Jun. 27, 2014 (CN) .......................... 2014 1 0302575

(51) Int. Cl.
G06F 1/16 (2006.01)

(52) U.S. Cl.
CPC ............ G06F 1/1624 (2013.01); G06F 1/1618 (2013.01); G06F 1/1662 (2013.01); G06F 1/1681 (2013.01)

(58) Field of Classification Search
CPC .. G06F 1/1624; G06F 1/1618; G06F 1/1681; G06F 1/1662
USPC ......... 361/679.55–679.58; 455/556.1, 566.2, 455/575.4, 575.1–575.8
See application file for complete search history.

(56) References Cited

U.S. PATENT DOCUMENTS

| | | | |
|---|---|---|---|
| 8,102,675 B2* | 1/2012 | Kilpinen | G06F 1/1616 361/679.26 |
| 2008/0161075 A1* | 7/2008 | Kim | H04M 1/0237 455/575.4 |
| 2008/0180892 A1* | 7/2008 | Lai | G06F 1/1616 361/679.09 |
| 2011/0122555 A1* | 5/2011 | Yeh | G06F 1/1616 361/679.01 |
| 2012/0154999 A1* | 6/2012 | Park | G06F 1/1681 361/679.01 |
| 2012/0268880 A1* | 10/2012 | Tomita | G06F 1/1616 361/679.09 |
| 2012/0328222 A1* | 12/2012 | Chen | G06F 1/1616 384/26 |
| 2013/0044422 A1* | 2/2013 | Li | G06F 1/162 361/679.08 |
| 2013/0148276 A1* | 6/2013 | Yu | H04M 1/0237 361/679.01 |
| 2013/0331041 A1* | 12/2013 | Teshima | H04B 1/40 455/73 |
| 2014/0139987 A1* | 5/2014 | Onda | G06F 1/16 361/679.02 |
| 2015/0009611 A1* | 1/2015 | Constin | G06F 1/1624 361/679.11 |
| 2015/0124388 A1* | 5/2015 | Shen | G06F 1/1616 361/679.09 |

* cited by examiner

*Primary Examiner* — Courtney Smith
*Assistant Examiner* — Sagar Shrestha
(74) *Attorney, Agent, or Firm* — Harness, Dickey & Pierce, P.L.C.

(57) ABSTRACT

A laptop includes a screen and a base having a keyboard. An end of the screen is articulated to an end of the base via a rotating device; and a first distance between a bottom edge of the screen and a bottom edge of the keyboard is smaller than a second distance between a top end of the screen and the bottom edge of the keyboard when the screen is closed onto the base. A guide rail is provided at two sides of the base, and the screen is slidable along the guide rail. The rotating device includes an articulated shaft connected to the base; and at any position on the guide rail, the screen is rotatable about the articulated shaft. When the screen is closed onto the base, the display surface of the screen faces outwards, thus the user can use the laptop in a tablet computer mode.

13 Claims, 12 Drawing Sheets

LAPTOP

CROSS-REFERENCE TO RELATED APPLICATION

This application claims the benefit of priorities to Chinese Patent Application No. 201410302575.9 titled "ROTATING DEVICE AND ELECTRONIC DEVICE", filed with the Chinese State Intellectual Property Office on Jun. 27, 2014, and Chinese Patent Application No. 201410288793.1 titled "LAPTOP", filed with the Chinese State Intellectual Property Office on Jun. 24, 2014, the entire disclosures of which are incorporated herein by reference.

BACKGROUND

1. Technical Field

The present application relates to the field of electronic devices, and particularly to a laptop.

2. Related Art

With the development of electronic devices, tablet computers have been widely used. One of the reasons is that the tablet computer is convenient to use.

For improving the competitiveness of laptops, various laptops with a mixed configuration have been developed. Such laptops with the mixed configuration may be used as a laptop, and also as a tablet computer.

However, the laptops with the mixed configuration in the conventional technology are similar to the conventional laptops in the configuration, thus it is still inconvenient for a user to use the laptops with the mixed configuration.

SUMMARY

A laptop according to the present application includes a screen, and a base provided with a keyboard; wherein the screen has one end articulated to an end of the base via a rotating device; and in a case that the screen is closed onto the base, a first distance between a bottom edge of the screen and a bottom edge of the keyboard is smaller than a second distance between a top end of the screen and the bottom edge of the keyboard; a guide rail is provided at two sides of the base, and the screen is slidable along the guide rail; the rotating device includes an articulated shaft connected to the base; and at any position on the guide rail, the screen is rotatable about the articulated shaft connected to the base.

DETAILED DESCRIPTION

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

Figure 1:
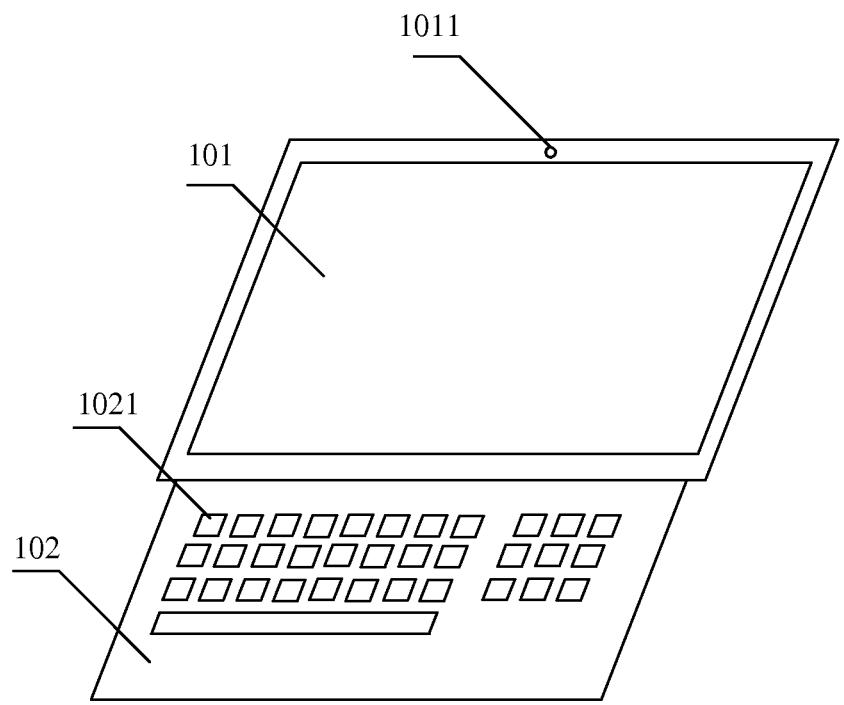
FIG. 1 is a structural view of a first embodiment of a laptop according to the present application.

FIG. 1 is a structural view of a first embodiment of a laptop according to the present application. As shown in FIG. 1, the laptop includes a screen 101, and a base 102 provided with a keyboard 1021.

The screen 101 has one end articulated to one end of the base 102 via a rotating device. When the screen 101 is closed onto the base 102, a first distance between a bottom edge of the screen and a bottom edge of the keyboard is smaller than a second distance between a top end of the screen and the bottom edge of the keyboard.

Figure 2:
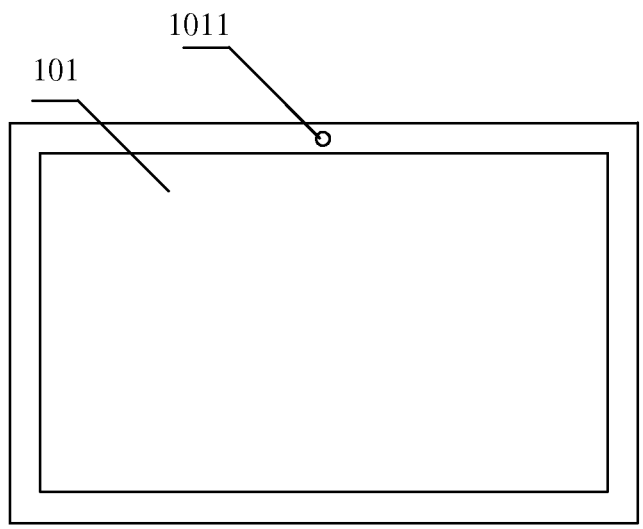
FIG. 2 is a top schematic view of the laptop according to the present application in a state that a screen is closed onto a base.
Figure 3:
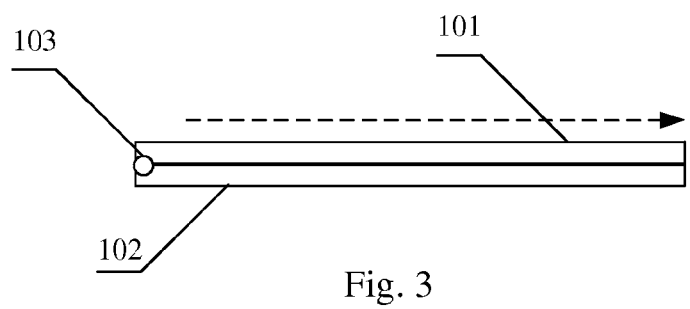
FIG. 3 is a side schematic view of the laptop according to the present application in a state that the screen is closed onto the base.

FIG. 2 is a top schematic view of the laptop according to the present application in a state that the screen is closed onto the base. FIG. 3 is a side schematic view of the laptop according to the present application in a state that the screen is closed onto the base. In FIGS. 2 and 3, the screen 101 is closed onto the base 102. In FIG. 2, for facilitating distinguishing the top end of the screen 101 from the bottom edge thereof, an end of the screen 101 where a camera 1011 is located is referred to the top end, and an end of the screen 101 opposite to the end where the camera 1011 is located is referred to as the bottom edge. Apparently, in practical application, the camera on the screen 101 may also be arranged at other positions, or no camera is provided on the screen 101. However, the position relationship between the top end and the bottom edge of the screen 101 remains unchanged.

In FIG. 2, the base 102 is located under the screen 101, thus it is not shown in FIG. 2. In this embodiment, when the screen 101 is closed onto the base 102, a display surface of the screen faces upwards, thus the laptop can be used as a tablet computer. The display surface of the screen faces upwards, i.e., has the same orientation as the keyboard, thus when the screen 101 is closed onto the base 102, the first distance between the bottom edge of the screen and the bottom edge of the keyboard is smaller than the second distance between the top end of the screen and the bottom edge of the keyboard. In other words, when the screen 101 is closed onto the base 102, the distance between the bottom edge of the screen and the bottom edge of the keyboard is smaller.

A guide rail (not shown in FIG. 2) is provided at two sides of the base 102, and the screen 101 is slidable along the guide rail.

For example, in FIG. 3, the screen 101 slides with respect to the base 102 along the guide rail in a direction indicated by a dotted arrow.

The rotating device for achieving the rotatable connection between the screen and the base may include an articulated shaft 103, and the articulated shaft 103 is connected to the base. The screen can rotate about the articulated shaft 103 connected to the base at any position on the guide rail.

Figure 4:
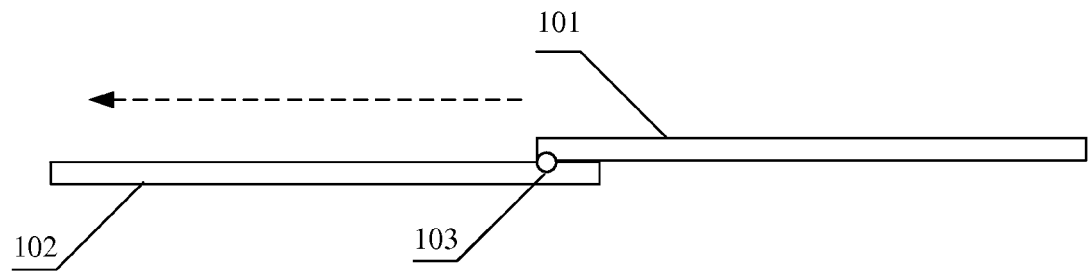
FIG. 4 is a side schematic view of the laptop at an attitude as shown in FIG. 1.

FIG. 4 is a side schematic view of the laptop at an attitude as shown in FIG. 1. As shown in FIG. 4, at this attitude, the screen 101 slides with respect to the base 102 along the guide rail to a position close to a limit position. At this time, the keyboard on the base 102 is no longer covered by the screen 101 and is exposed completely, thus the user can perform an input operation through the keyboard, and the laptop in this state may work in a normal working mode of the laptop.

At this attitude, the screen 101 can still slide with respect to the base 102 along the guide rail in the direction indicated by the dotted arrow, and when sliding to any position, the screen 101 is rotatable about the articulated shaft 103 connected to the base 102.

Figure 5:
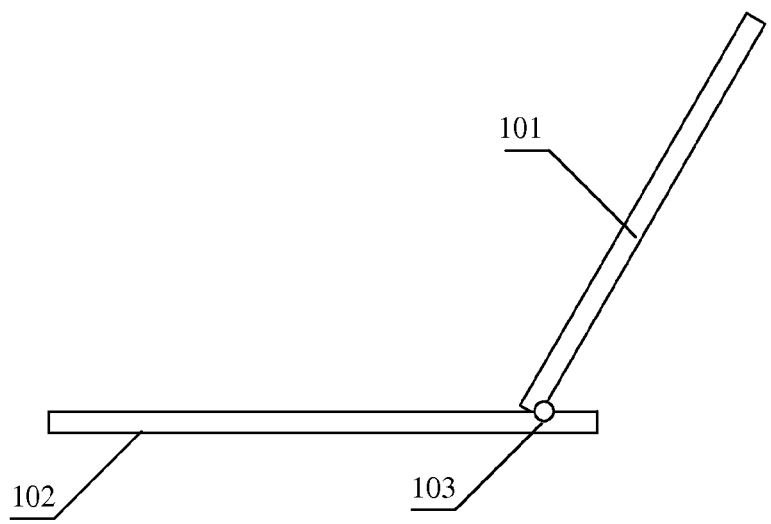
FIG. 5 is a side schematic view of the laptop in a state that the screen slides to the position shown in FIG. 4 with respect to the base and then rotates by a certain angle about an articulated shaft.

FIG. 5 is a side schematic view of the laptop in a state that the screen slides to the position shown in FIG. 4 with respect to the base and then rotates by a certain angle about the articulated shaft. As shown in FIG. 5, in this state, a certain angle is formed between the screen 101 and the base 102, and the laptop may work in a working mode same as a normal laptop.

Figure 6:
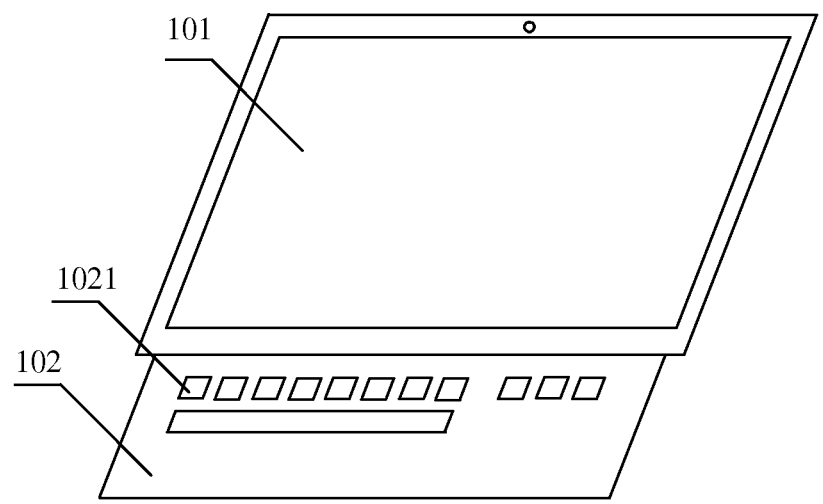
FIG. 6 is a schematic view showing the structure of the laptop according to the present application in another usage mode.
Figure 7:
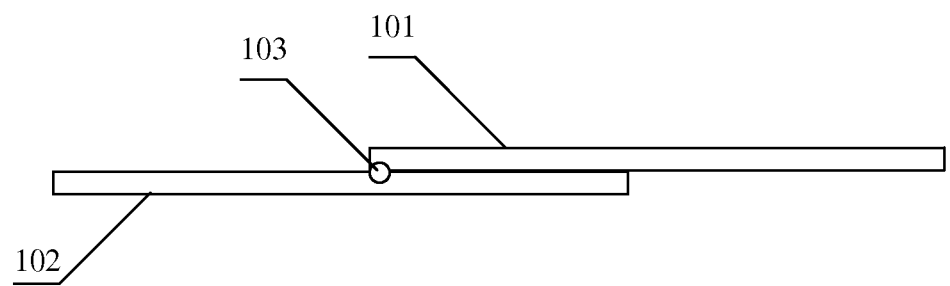
FIG. 7 is a side schematic view of the laptop in the usage mode as shown in FIG. 6.

FIG. 6 is schematic view showing the structure of the laptop according to the present application in another usage mode. FIG. 7 is a side schematic view of the laptop in the usage mode as shown in FIG. 6. As shown in FIGS. 6 and 7, the screen 101 and the base 102 can slide with respect to each other by a small distance. In this state, a part of keys of the keyboard on the base 102 are exposed. A camera may be provided on a rear side of the screen 101, and in the usage mode shown in FIG. 6, the laptop can be switched to a camera mode.

In summary, in the laptop according to this embodiment, when the screen is closed onto the base, the first distance between the bottom edge of the screen and the bottom edge of the keyboard is smaller than the second distance between the top end of the screen and the bottom edge of the keyboard, thus when the screen is closed onto the base, the display surface of the screen faces outwards, which allows the user to use the laptop in a tablet computer mode more easily.

Furthermore, the guide rail are provided at the two sides of the base, and the screen is slidable along the guide rail; and at any position on the guide rail, the screen is rotatable about the articulated shaft connected to the base. Thus, the laptop according to the present application has various usage modes.

In practical application, in order to fix the screen with respect to the base after the screen slides to any position on the base, a first damper component is provided on the articulated shaft 103, thereby preventing the screen from sliding freely along the base after the user stops moving the screen. A first friction force is provided between the first damper component and the guide rail, and the first friction force is greater than a preset friction force.

Figure 8:
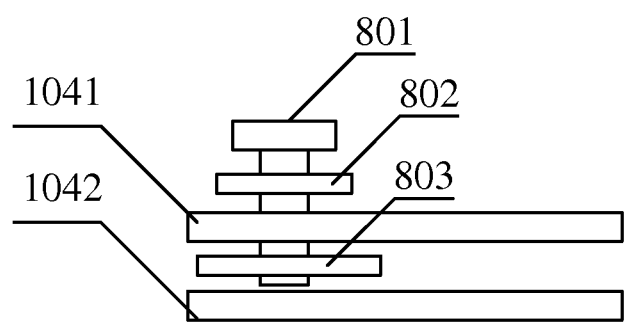
FIG. 8 is a schematic view showing the structure of a first damper component according to an embodiment of the present application.

FIG. 8 is a schematic view showing the structure of the first damper component according to an embodiment of the present application. As shown in FIG. 8, the first damper component may include: a screw 801, a friction plate 802 and an articulated shaft base 803.

The articulated shaft base 803 is located below an upper layer 1041 of the guide rail, and the friction plate 802 is located above the upper layer 1041 of the guide rail, the screw 801 passes through the friction plate 802 and the upper layer 1041 of the guide rail to be fastened to the articulated shaft base 803. The articulated shaft base 803 may be connected to the articulated shaft (not shown in FIG. 8), and a screen of the laptop may be provided on the articulated shaft base 803. The screen is slidable on the guide rail along with the articulated shaft base 803.

Figure 9:
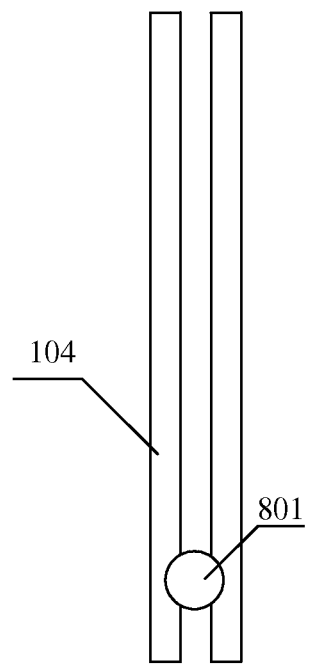
FIG. 9 is a top schematic view showing the first damper component and a guide rail according to an embodiment of the present application.

FIG. 9 is a top schematic view showing the first damper component and the guide rail according to an embodiment of the present application. In conjunction with FIGS. 8 and 9, as shown in the Figures, the upper layer 1041 of the guide rail 104 is clamped between the articulated shaft base 803 and the friction plate 802 via the screw 801, thus a certain friction force is generated when the articulated shaft base 803 moves along the guide rail 104, thereby ensuring that when moving to any position on the guide rail, the screen arranged on the base can be fixed with respect to the base.

In order to provide a feedback to the user when the screen slides to the limit position and to decelerate the screen when reaching the limit position, a second damper component is provided at an area, close to a top end of the keyboard, of the guide rail on the base of the laptop according to the present application. When the articulated shaft of the screen slides to the above-mentioned area along the guide rail, the second damper component generates a reverse damping.

Figure 10:
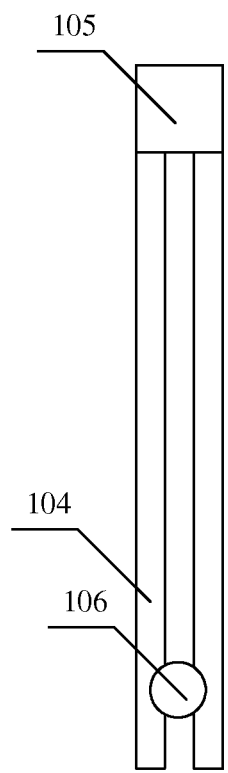
FIG. 10 is a top schematic view of a guide rail including a second damper component according to an embodiment of the present application.

FIG. 10 is a top schematic view of the guide rail including the second damper component according to an embodiment of the present application. As shown in FIG. 10, a second damper component 105 is provided on the guide rail 104 at an area close to the top end of the keyboard. An element 106 is connected to the articulated shaft and is configured to drive a portion of the articulated shaft that slides along the guide rail 104. When the articulated shaft of the screen slides to the area at the top end of the keyboard along the guide rail, the second damper component 105 generates a reverse damping, which applies a reverse action force to the element 106.

In practical application, the second damper component may be a spring.

In order to fix the screen when sliding to a limit position on the guide rail, a fixing component may be further provided at an end, close to the top end of the keyboard, of the guide rail on the base of the laptop according to the present application. When the articulated shaft of the screen slides along the guide rail to the end of the guide rail that is close to the top end of the keyboard, the fixing component fixes the relative position between the screen and the base.

Figure 11:
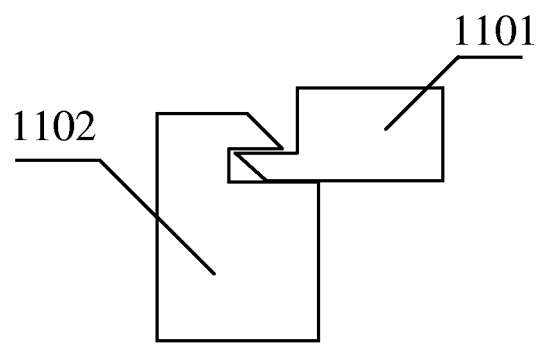
FIG. 11 is a schematic view showing the structure of a fixing component according to an embodiment of the present application.

FIG. 11 is a schematic view showing the structure of the fixing component according to an embodiment of the present application. As shown in FIG. 11, the fixing component may include a first fixing hook 1101 and a second fixing hook 1102. The first fixing hook 1101 may be arranged on the guide rail at the end close to the top end of the keyboard, and the second fixing hook 1102 may be arranged on the articulated shaft. When the screen moves to the limit position at a top end of the base, the first fixing hook 1101 and the second fixing hook 1102 may snap fit with each other as shown in FIG. 11, thereby fixing the screen at the limit position.

The rotating device according to the above embodiments is configured to realize the rotatable connection between the screen and the base, and includes the articulated shaft 103 connected to the base. At any position on the guide rail, the screen is rotatable about the articulated shaft 103.

Since increasingly higher requirements are imposed on the portability of an electronic device on the market currently, a rotating device is provided according to an embodiment of the present application, which reduces a thickness of the rotating device while ensuring that the strength of the rotating device meets a requirement for supporting the screen, and further reduce a thickness of the electronic device employing the rotating device.

Figure 12:
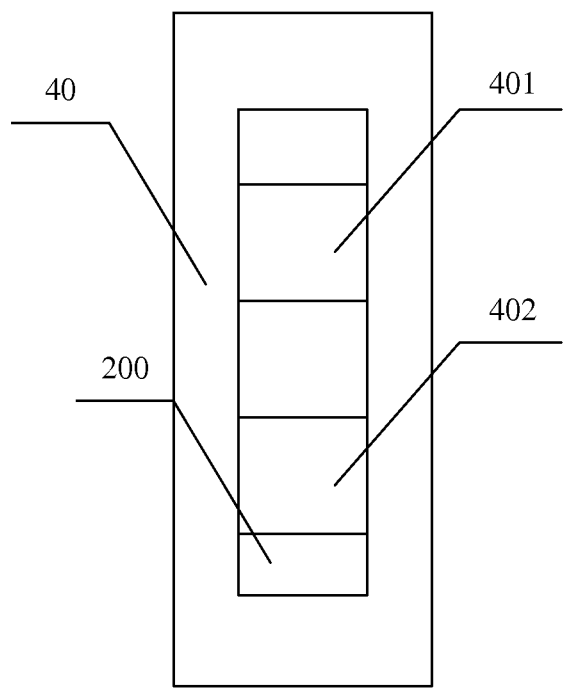
FIG. 12 is a top schematic view showing the structure of a first embodiment of a rotating device for the laptop according to the present application.
Figure 13:
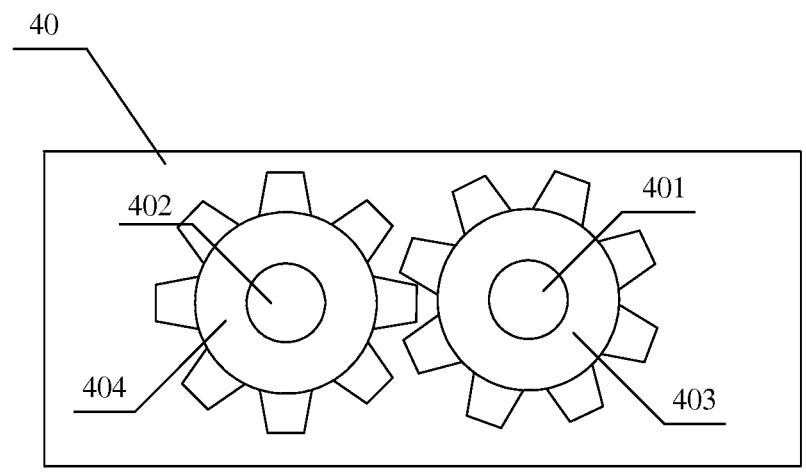
FIG. 13 is a sectional schematic view showing the structure of the first embodiment of the rotating device according to the present application.
Figure 14:
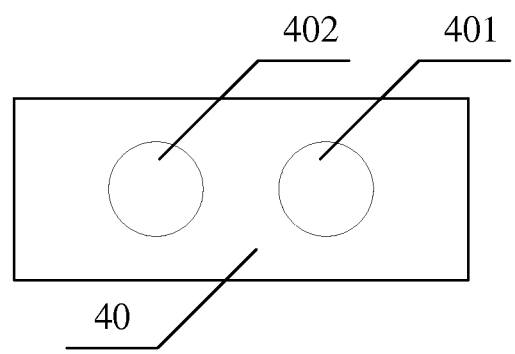
FIG. 14 is a side schematic view showing the structure of the first embodiment of the rotating device according to the present application.

FIG. 12 is a top schematic view showing the structure of a first embodiment of a rotating device according to the present application. FIG. 13 is a sectional schematic view showing the structure of the first embodiment of the rotating device according to the present application. FIG. 14 is a side schematic view showing the structure of the first embodiment of the rotating device according to the present application. As shown in FIGS. 12, 13 and 14, the rotating device includes an articulated shaft 401, a first coupling rotating shaft 402, and a rotating shaft supporting body 40.

The rotating shaft supporting body 40 is provided with a rotating shaft supporting space 200, and the articulated shaft 401 and the first coupling rotating shaft 402 are arranged in the rotating shaft supporting space 200.

A main gear 403 (not shown in FIG. 12) is provided on the articulated shaft 401, and rotates along with the rotation of the articulated shaft 401. A first coupling gear 404 (not shown in FIG. 12) is provided on the first coupling rotating shaft 402. The main gear 403 engages with the first coupling gear 404.

The first coupling gear 404 is rotatable about the first coupling rotating shaft 402, and the first coupling rotating shaft 402 is in interference fit with the first coupling gear 404.

The first coupling gear 404 is sleeved on the first coupling rotating shaft 402. A diameter of an inner bore of the first coupling gear 404 is slightly smaller than an outer diameter of the first coupling rotating shaft 402. After the first coupling rotating shaft 402 passes through the inner bore of the first coupling gear 404, the first coupling rotating shaft 402 is in interference fit with the first coupling gear 404, thus a friction force may be generated when the first coupling gear 404 rotates about the first coupling rotating shaft 402. The friction force can fix the position of a component connected to the articulated shaft 401 when the component rotate along with the articulated shaft 401 to any position.

In practical application, the component connected to the articulated shaft 401 may be a screen of the laptop. Due to the interference fit between the first coupling rotating shaft and the first coupling gear, the position of the screen of the laptop may be fixed when the screen rotates to any position.

In this embodiment, at least two rotating shafts are adopted, which include the articulated shaft and the first coupling rotating shaft, thus a part of the weight of the component supported on the articulated shaft can be borne by the first coupling rotating shaft. That is, the articulated shaft according to this embodiment can support a component with a greater weight compared to a single rotating shaft which has the same size as the articulated shaft. In other words, if the components to be supported have the same weight, the size of the individual rotating shaft may be reduced when using the rotating device according to this embodiment. As shown in FIG. 13, a thickness of the rotating device, i.e., a width of the rotating shaft supporting body 40 in FIG. 13, mainly depends on a diameter of the rotating shaft and a diameter of the gear. Hence, when multiple rotating shafts and gears are used to constitute the rotating device, the diameter of each of the rotating shafts and the gears may be reduced, thereby reducing the thickness of the rotating device.

In summary, in this embodiment, at least two rotating shafts are adopted, which include the articulated shaft and the first coupling rotating shaft, the main gear is provided on the articulated shaft and rotates along with the rotation of the articulated shaft, and the first coupling gear is provided on the first coupling rotating shaft. The main gear engages with the first coupling gear. Hence, a part of the weight of the components supported on the articulated shaft, such as a screen, may be borne by the first coupling rotating shaft, thus the diameter of the individual rotating shaft can be reduced, which reduces the thickness of the rotating device while ensuring that the strength of the rotating device meets the requirement for supporting the screen, and further reduces the thickness of the electronic device adopting the rotating device.

Figure 15:
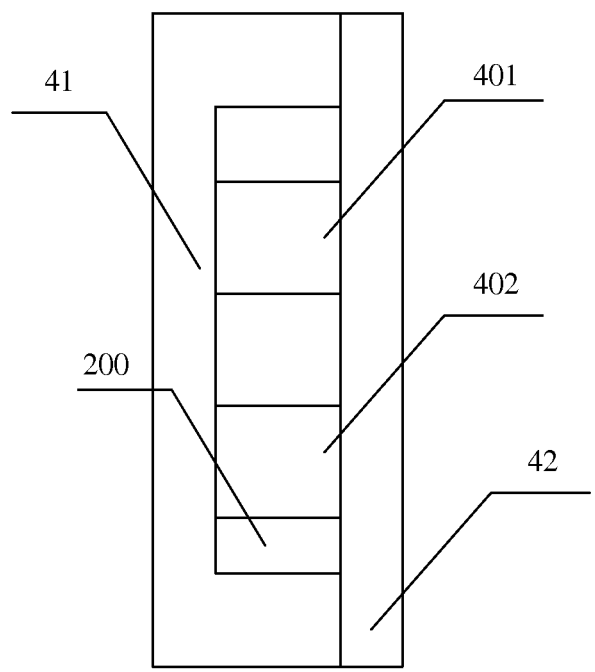
FIG. 15 is a top schematic view of an embodiment of a rotating shaft supporting body of the rotating device according to the present application.

FIG. 15 is a top schematic view of an embodiment of a rotating shaft supporting body according to the present application. As shown in FIG. 15, the rotating shaft supporting body includes a first rotating shaft supporting portion 41 and a second rotating shaft supporting portion 42. The first rotating shaft supporting portion 41 and the second rotating shaft supporting portion 42 together form the rotating shaft supporting space 200.

The articulated shaft 401 has one end arranged on the first rotating shaft supporting portion 41 and another end arranged on the second rotating shaft supporting portion 42.

The first coupling rotating shaft 402 has one end arranged on the first rotating shaft supporting portion 41 and another end arranged on the second rotating shaft supporting portion 42.

In the embodiment shown in FIG. 15, the main gear (not shown in FIG. 15) is located in the rotating shaft supporting space 200, and may be clamped by the first rotating shaft supporting portion 41 and the second rotating shaft supporting portion 42, to be in interference fit with the first rotating shaft supporting portion 41 and the second rotating shaft supporting portion 42. An axial thickness of the main gear may be slightly greater than a width of the rotating shaft supporting space 200. In this way, when the main gear rotates, a friction force may be generated between the main gear and the first rotating shaft supporting portion 41 as well as between the main gear and the second rotating shaft supporting portion 42, thus the position of the components connected to the articulated shaft 401 can be fixed when the components rotate to any position along with the articulated shaft 401.

In practical application, the component connected to the articulated shaft 401 may be a screen of a laptop. The main gear is located in the rotating shaft supporting space, thus the screen of the laptop may be clamped by the first rotating shaft supporting portion and the second rotating shaft supporting portion when the screen rotates to any position, thereby fixing the position of the screen of the laptop.

Similarly, the first coupling gear is located in the rotating shaft supporting space 200, and may also be clamped by the first rotating shaft supporting portion 41 and the second rotating shaft supporting portion 42, to be in interference fit with the first rotating shaft supporting portion 41 and the second rotating shaft supporting portion 42. In this way, when the first coupling gear rotates, a friction force may be generated between the first coupling gear and the first rotating shaft supporting portion 41 as well as between the first coupling gear and the second rotating shaft supporting portion 42, thus the position of the components connected to the articulated shaft 401 can be fixed when the components rotate to any position along with the articulated shaft 401.

In practical application, for facilitating manufacture and saving the manufacturing cost for the gear, multiple first coupling gears may be provided. The multiple first coupling gears are superposed to each other in an axial direction of the first coupling rotating shaft 402, and each of the multiple first coupling gears engages with the main gear. When multiple first coupling gears are adopted, a thickness of an individual gear may be reduced, thus the gear may be made by a punching process. If the first coupling gear is a gear with a greater thickness, the gear is required to be made by a casting process. Since the punching process has a lower cost than the casting process, the manner using multiple first coupling gears may save the manufacturing cost for the rotating device according to the embodiments of the present application.

Figure 16:
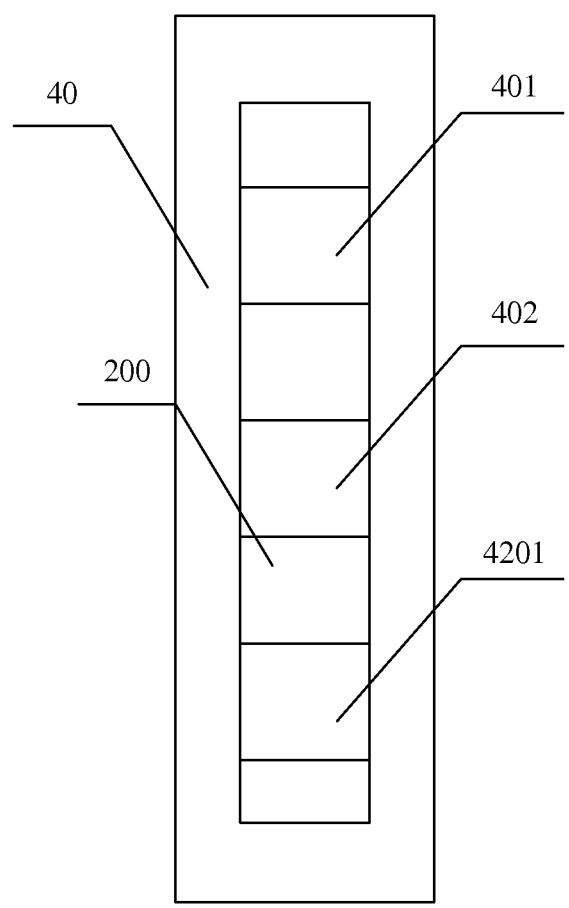
FIG. 16 is a top schematic view showing the structure of a second embodiment of a rotating device for the laptop according to the present application.
Figure 17:
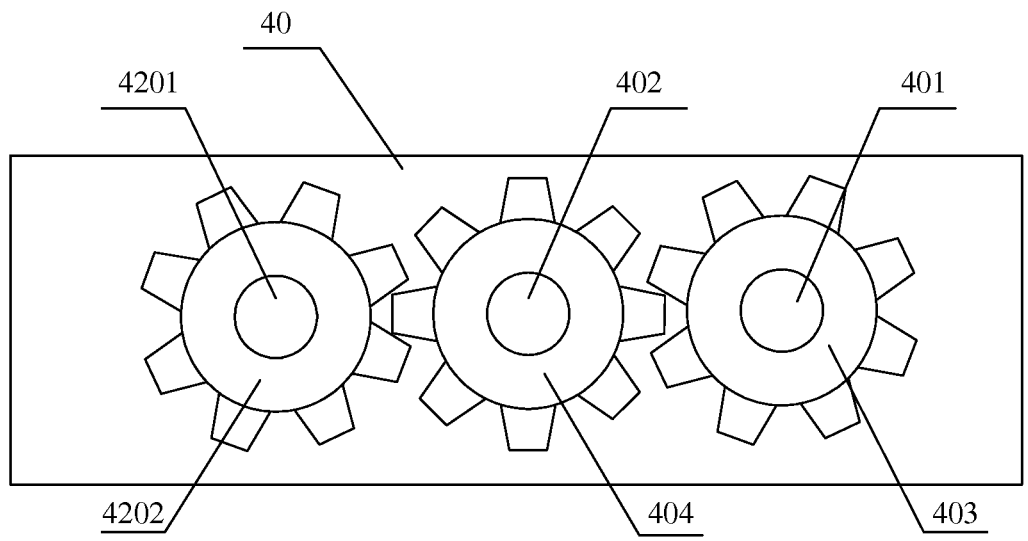
FIG. 17 is a sectional schematic view showing the structure of the second embodiment of the rotating device according to the present application.
Figure 18:
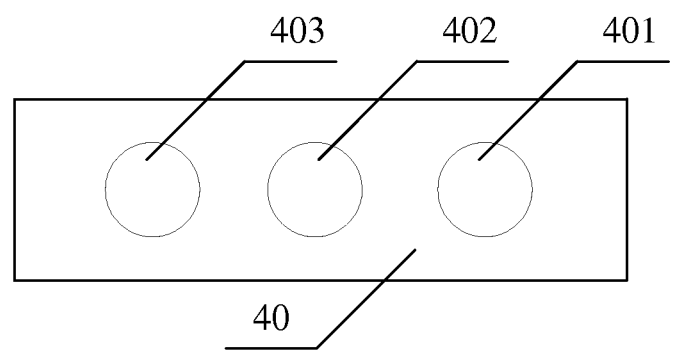
FIG. 18 is a side schematic view showing the structure of the second embodiment of the rotating device according to the present application.

FIG. 16 is a top schematic view showing the structure of a second embodiment of the rotating device according to the present application. FIG. 17 is a sectional schematic view showing the structure of the second embodiment of the rotating device according to the present application. FIG. 18 is a side schematic view showing the structure of the second embodiment of the rotating device according to the present application. Unlike the first embodiment, the rotating device according to the second embodiment as shown in FIGS. 16, 17 and 18 further includes a second coupling rotating shaft 4201, and a second coupling gear 4202 provided on the second coupling rotating shaft 4201. The second coupling gear 4202 engages with the first coupling gear 404.

The second coupling gear 4202 is rotatable about the second coupling rotating shaft 4201, and the second coupling rotating shaft 4201 is in interference fit with the second coupling gear 4202.

Compared with the rotating device in the first embodiment, the rotating device according to this embodiment is provided with an increased number of coupling rotating shafts, and the second coupling rotating shaft may further bear a part of the weight supported on the articulated shaft, which further reduces the diameter of the individual rotating shaft and the diameter of an individual gear, and reduces the thickness of the rotating device.

In practical application, for reducing the manufacturing cost for the second coupling gear, the second coupling gear may include multiple gears each having a small axial thickness. The multiple second coupling gears are superposed to each other in an axial direction of the second coupling rotating shaft, and each of the multiple second coupling gears engages with the main gear.

Figure 19:
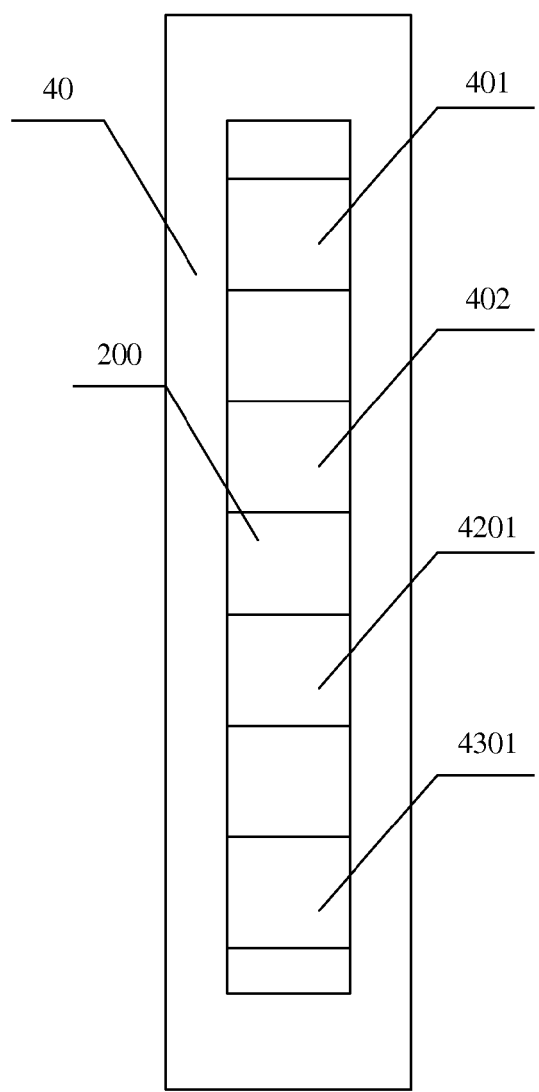
FIG. 19 is a top schematic view showing the structure of a third embodiment of a rotating device for the laptop according to the present application.
Figure 20:
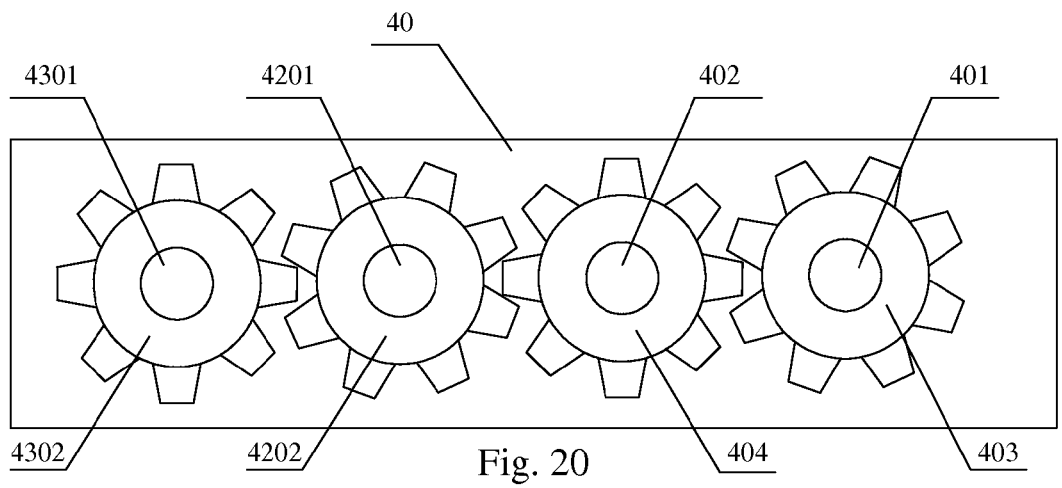
FIG. 20 is a sectional schematic view showing the structure of the third embodiment of the rotating device according to the present application.
Figure 21:
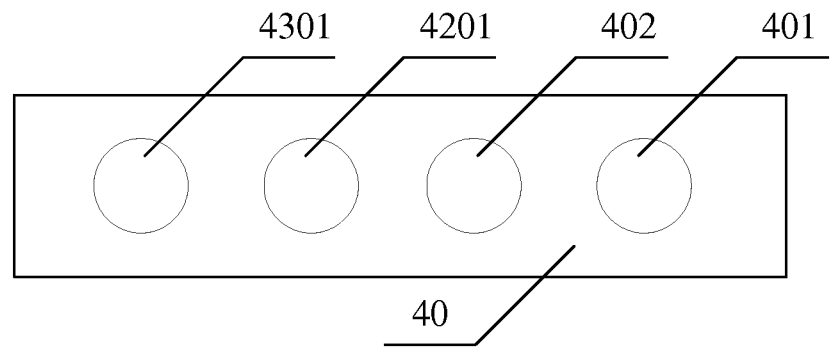
FIG. 21 is a side schematic view showing the structure of the third embodiment of the rotating device according to the present application.

In practical application, the number of each of the coupling rotating shafts and the gears may be further increased. FIG. 19 is a top schematic view showing the structure of a third embodiment of the rotating device according to the present application. FIG. 20 is a sectional schematic view showing the structure of the third embodiment of the rotating device according to the present application. FIG. 21 is a side schematic view showing the structure of the third embodiment of the rotating device according to the present application. Unlike the second embodiment, the rotating device in the third embodiment as shown in FIGS. 19, 20 and 21 further includes: a third coupling rotating shaft 4301, and a third coupling gear 4302 provided on the third coupling rotating shaft 4301. The third coupling gear 4302 engages with the second coupling gear 4201.

The third coupling gear 4302 is rotatable about the third coupling rotating shaft 4301, and the third coupling rotating shaft 4301 is in interference fit with the third coupling gear 4302.

Compared with the rotating device according to the second embodiment, the rotating device according to this embodiment is provided with an increased number of coupling rotating shafts, and the third coupling rotating shaft may further bear a part of the weight supported on the articulated shaft, which further reduces the diameter of the individual rotating shaft and the diameter of the individual gear, and reduces the thickness of the rotating device. Therefore, the number of the coupling rotating shafts may be further increased by the person skilled in the art according to actual requirements, which will not be listed herein.

In practical application, the articulated shaft 401 may be further provided with a holder, and the holder rotates along with the rotation of the articulated shaft. The holder may be provided with a fixing member mounting hole for cooperating with a bottom portion of the screen of the laptop. Components of the laptop, such as the screen, may be fixed onto the holder, to turn along with the rotation of the rotating shaft.

For increasing the damping of the rotating device during the rotation, a damping elastic sheet may be further arranged between two adjacent rotating shafts of the rotating device according to an embodiment of the present application.

Figure 22:
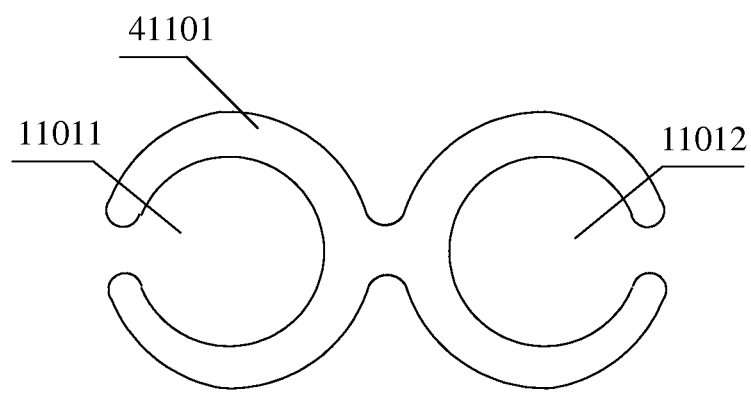
FIG. 22 is a schematic view showing the structure of a damping elastic sheet of the rotating device according to an embodiment of the present application.
Figure 23:
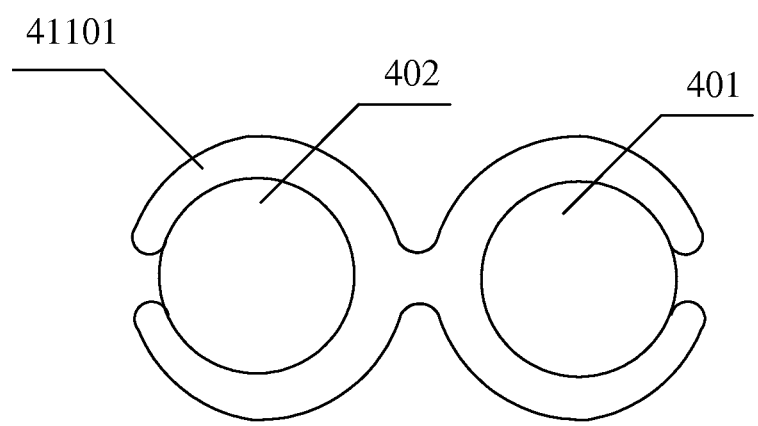
FIG. 23 is a schematic view showing the structure of the damping elastic sheet and rotating shafts according to an embodiment of the present application.

FIG. 22 is a schematic view showing the structure of the damping elastic sheet according to an embodiment of the present application. FIG. 23 is a schematic view showing the structure of the damping elastic sheet and rotating shafts according to an embodiment of the present application. As illustrated in FIGS. 22 and 23, two ends of the damping elastic sheet 41101 are respectively provided with a first opening 11011 and a second opening 11012. The first opening 11011 is in snap fit with the articulated shaft 401, and the second opening 11012 is in snap fit with the first coupling rotating shaft 402. An inner diameter of the first opening 11011 is smaller than an outer diameter of the articulated shaft 401, and an inner diameter of the second opening 11012 is smaller than an outer diameter of the first coupling rotating shaft 402.

The damping elastic sheet 41101 may be arranged on the same side of the main gear and the first coupling gear. Specifically, two sides of the main gear and the first coupling gear may be each provided with the damping elastic sheet; alternatively, the damping elastic sheet may be provided on only one side of the main gear and the first coupling gear.

The articulated shaft 401 is snapped fit in the first opening 11011, and the first coupling rotating shaft 402 is snapped fit in the second opening 11012, the inner diameter of the first opening 11011 is smaller than the outer diameter of the articulated shaft 401, and the inner diameter of the second opening 11012 is smaller than the outer diameter of the first coupling rotating shaft 402. Thus, when the articulated shaft and the first coupling rotating shaft rotate, the damping elastic sheet may respectively generate a reverse damping on the articulated shaft and the first coupling rotating shaft, thereby increasing the damping of the rotating device in the rotation.

In practical application, for connecting the rotating device to the guide rail on the base of the laptop, the first rotating shaft supporting portion may be further provided with a groove.

Figure 24:
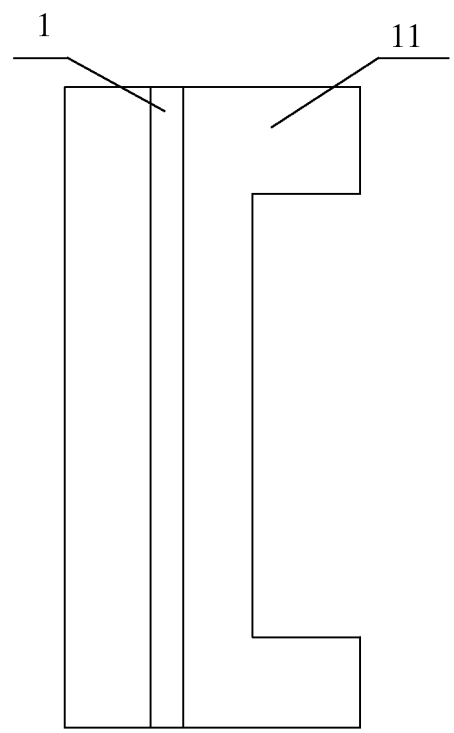
FIG. 24 is a top schematic view of a first rotating shaft supporting portion having a groove according to an embodiment of the preset application.
Figure 25:
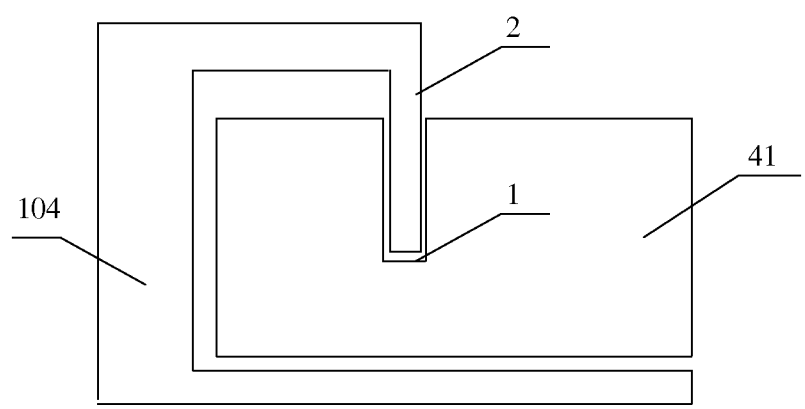
FIG. 25 is a front schematic view of the first rotating shaft supporting portion and a guide rail according to an embodiment of the present application.

FIG. 24 is a top schematic view of the first rotating shaft supporting portion having the groove according to an embodiment of the preset application. FIG. 25 is a front schematic view of the first rotating shaft supporting portion and the guide rail according to an embodiment of the present application. As shown in FIGS. 24 and 25, the first rotating shaft supporting portion 41 is provided with a groove 1, and the groove 1 matches with a protrusion 2 of the guide rail 104 on the base of the laptop. The rotating device is slidable along the guide rail 104 when the protrusion 2 is embedded in the groove 1, thereby achieve various usage modes of the laptop.

That is, the rotating device can drive the screen arranged on the rotating device to slide along the guide rail, thereby forming a structure similar to a slide phone between the screen and the base of the laptop.

The above description is only exemplary embodiments of the present application. It should be noted that, for the person skilled in the art, a few of modifications and improvements may be made to the present application without departing from the principle of the present application. The protection scope of the present application is defined by the claims.

The invention claimed is:

1. A laptop, comprising:
a screen, and a base provided with a keyboard;
wherein the screen has one end articulated to an end of the base via a rotating device; and
in a case that the screen is closed onto the base, a first distance between a bottom edge of the screen and a bottom edge of the keyboard is smaller than a second distance between a top end of the screen and the bottom edge of the keyboard;
a guide rail is provided at two sides of the base, and the screen is slidable along the guide rail;
the rotating device comprises an articulated shaft connected to the base; and
at any position on the guide rail, the screen is rotatable about the articulated shaft connected to the base;
a first damper component is provided on the articulated shaft, and a first friction force is provided between the first damper component and the guide rail; and wherein the first friction force fixes the screen with respect to the base after the screen slides to any position on the base; and
the first damper component comprises:
a screw, a friction plate and an articulated shaft base;
the articulated shaft base is located under an upper layer of the guide rail, the friction plate is located above the upper layer of the guide rail, and the screw passes through the friction plate and the upper layer of the guide rail to be fastened to the articulated shaft base.

2. The laptop according to claim 1, wherein a second damper component is provided at an area, close to a top end of the keyboard, of the guide rail on the base, and the second damper component generates a reverse damping in a case that the articulated shaft of the screen slides to the area along the guide rail.

3. The laptop according to claim 1, wherein a fixing component is provided at an end, close to a top end of the keyboard, of the guide rail on the base, and the fixing component fixes the relative position between the screen and the base in a case that the articulated shaft of the screen slides along the guide rail to the end of the guide rail that is close to the top end of the keyboard.

4. The laptop according to claim 1, wherein the rotating device further comprises:
a first coupling rotating shaft, and a rotating shaft supporting body;
the rotating shaft supporting body is provided with a rotating shaft supporting space, and the articulated shaft and the first coupling rotating shaft are arranged in the rotating shaft supporting space;
a main gear is provided on the articulated shaft, and the main gear rotates along with the rotation of the articulated shaft, and a first coupling gear is provided on the first coupling rotating shaft; and the main gear engages with the first coupling gear; and
the first coupling gear is rotatable about the first coupling rotating shaft, and the first coupling rotating shaft is in interference fit with the first coupling gear.

5. The laptop according to claim 4, wherein the rotating shaft supporting body comprises:
a first rotating shaft supporting portion and a second rotating shaft supporting portion, and the first rotating shaft supporting portion and the second rotating shaft supporting portion together form the rotating shaft supporting space;

the articulated shaft has one end arranged on the first rotating shaft supporting portion and another end arranged on the second rotating shaft supporting portion; and the first coupling rotating shaft has one end arranged on the first rotating shaft supporting portion and another end arranged on the second rotating shaft supporting portion.

6. The laptop according to claim 5, wherein the main gear is located in the rotating shaft supporting space, and is clamped between the first rotating shaft supporting portion and the second rotating shaft supporting portion, to be in interference fit with the first rotating shaft supporting portion and the second rotating shaft supporting portion.

7. The laptop according to claim 5, wherein the first coupling gear is located in the rotating shaft supporting space, and is clamped between the first rotating shaft supporting portion and the second rotating shaft supporting portion, to be in interference fit with the first rotating shaft supporting portion and the second rotating shaft supporting portion.

8. The laptop according to claim 5, wherein a plurality of the first coupling gears are provided, and the plurality of the first coupling gears are superposed to each other in an axial direction of the first coupling rotating shaft, and each of the plurality of the first coupling gears engages with the main gear.

9. The laptop according to claim 4, wherein the rotating device further comprises:

a second coupling rotating shaft, and a second coupling gear provided on the second coupling rotating shaft, and the second coupling gear engages with the first coupling gear; and the second coupling gear is rotatable about the second coupling rotating shaft, and the second coupling rotating shaft is in interference fit with the second coupling gear.

10. The laptop according to claim 4, wherein the articulated shaft is further provided with a holder, and the holder rotates along with the rotation of the articulated shaft.

11. The laptop according to claim 10, wherein the holder is provided with a fixing member mounting hole for cooperating with a bottom portion of the screen of the laptop.

12. The laptop according to claim 4, wherein the rotating device further comprises: a damping elastic sheet arranged on the same side of the main gear and the first coupling gear; and two ends of the damping elastic sheet are respectively provided with a first opening and a second opening; the articulated shaft is in snap fit with the first opening, and the first coupling rotating shaft is in snap fit with the second opening, an inner diameter of the first opening is smaller than an outer diameter of the articulated shaft, and an inner diameter of the second opening is smaller than an outer diameter of the first coupling rotating shaft.

13. The laptop according to claim 5, wherein the first rotating shaft supporting portion is provided with a groove, and the groove matches with a protrusion of the guide rail on the base of the laptop; and the rotating device is slidable along the guide rail in a case that the protrusion is embedded in the groove, to achieve various usage modes of the laptop.

* * * * *